(12) United States Patent
Sathyanarayana et al.

(10) Patent No.: US 9,263,868 B2
(45) Date of Patent: Feb. 16, 2016

(54) INTEGRAL BOX

(75) Inventors: Ashok Alilughatta Sathyanarayana, Pune (IN); Santosh Ganpat Shinde, Pune (IN)

(73) Assignee: SIGMA ELECTRIC MANUFACTURING CORPORATION, Garner, NC (US)

( * ) Notice: Subject to any disclaimer, the term of this patent is extended or adjusted under 35 U.S.C. 154(b) by 1712 days.

(21) Appl. No.: 12/552,438

(22) Filed: Sep. 2, 2009

(65) Prior Publication Data

US 2010/0051614 A1 Mar. 4, 2010

Related U.S. Application Data

(60) Provisional application No. 61/093,923, filed on Sep. 3, 2008.

(51) Int. Cl.
*H02G 3/18* (2006.01)
*H02G 3/08* (2006.01)

(52) U.S. Cl.
CPC ..................................... *H02G 3/081* (2013.01)

(58) Field of Classification Search
CPC ....................................................... H02G 3/08
USPC .............................. 220/3.8, 3.2, 3.3, 3.7, 4.02
See application file for complete search history.

(56) References Cited

U.S. PATENT DOCUMENTS

| | | | | | |
|---|---|---|---|---|---|
| 3,215,769 | A | * | 11/1965 | Slater | H02G 3/088 174/53 |
| 3,288,910 | A | * | 11/1966 | Zerwes | H01R 13/447 174/53 |
| 3,304,363 | A | * | 2/1967 | Zerwes | H02G 3/086 174/51 |
| 3,340,349 | A | * | 9/1967 | Zerwes | H02G 3/18 174/53 |
| 3,770,872 | A | * | 11/1973 | Brown | H02G 3/18 174/53 |
| 4,151,363 | A | * | 4/1979 | Nichols | H02G 3/065 174/655 |
| 4,223,796 | A | * | 9/1980 | Silver | H02G 3/081 220/3.7 |
| 4,343,411 | A | * | 8/1982 | Chesnut | H02G 3/14 174/67 |
| 5,360,130 | A | * | 11/1994 | Lehmann | H02G 3/14 220/3.8 |
| 5,726,385 | A | | 3/1998 | Lowery et al. | |
| 6,831,222 | B2 | | 12/2004 | Pastuch | |
| 6,992,252 | B1 | * | 1/2006 | Rao | H02G 3/083 174/135 |
| 7,005,578 | B2 | | 2/2006 | Gretz | |
| 7,129,413 | B1 | | 10/2006 | Rao et al. | |
| 7,207,830 | B2 | | 4/2007 | Conway | |
| 7,232,951 | B1 | | 6/2007 | Kovacs | |
| D563,896 | S | | 3/2008 | Greenslate | |
| 7,989,710 | B2 | * | 8/2011 | Hansen | H02G 3/185 174/482 |

* cited by examiner

*Primary Examiner* — King M Chu
(74) *Attorney, Agent, or Firm* — Cantor Colburn LLP

(57) ABSTRACT

In one embodiment, an integral box comprises a base with walls, with plate(s) extending from a side wall(s). Opening(s) in the side wall(s) and/or the base allow wiring to pass into the box. This box is formed as a single, unitary component.

11 Claims, 3 Drawing Sheets

INTEGRAL BOX

CROSS REFERENCE TO RELATED APPLICATION

This application claims the benefit of U.S. Provisional Application Ser. No. 61/093,923 filed Sep. 3, 2008, which is hereby incorporated by reference in its entirety.

BACKGROUND

Wiring boxes for containing electrical connections are known. Wiring entering a wiring box is typically connected to a particular electrical fixture or receptacle such as a lighting fixture, outlet, or switch. Outlet boxes can be used in exposed-conduit wiring installations where they are exteriorly mounted to a wall, column or ceiling and exposed to various environmental conditions. Wiring boxes typically include a housing and two plates removably attached thereto. These boxes are not sealed and allow water and dirt entry. The housing includes ribs formed with the walls of the housing and plates that have openings along the edges for securely fastening the plates to the housing. The design requires many secondary processes to setup and secure the covering plates to the box.

The UL514A test, directed to electrical boxes and the integrity of the plate attachment to the housing, was used to test multiple part boxes that had a steel strip crimped to the box. The test was intended to ensure that the steel strip remained adhered to the box under various conditions. Although industry requirements dictates that the boxes pass UL514A, many commercial boxes that claim to meet the standard had a large percentage of boxes that failed.

Wiring boxes are often the subject of evaluation by organizations that promulgate standards in connection therewith and one of the standards includes that a wiring box should have a minimum resistance to the environmental forces that are typically applied to the wiring box. There remains a need for a box that is more resistant to increased environmental forces.

BRIEF SUMMARY

Disclosed herein are integral boxes, and methods for making the same. In one embodiment, an integral box can comprise a base having a third wire access point; a first wall. a second wall, a third wall, and a fourth wall, extending from the base to form a cavity, and having a first wire access point; a first plate extending from the second wall and between the first wall and third wall: and a second plate extending from the fourth wall and between the first wall and third wall. The base, first wall, second wall, third wall, fourth wall, first plate and second plate, are formed as a single component. In some embodiments, the second wall has a first conduit extending from the first wire access point into the cavity and the fourth wall comprises a second conduit extending into the cavity from a second wire access point. The first conduit can extend into the cavity a distance of greater than or equal to a distance that the first plate extends from the second wall, and wherein the second conduit extends into the cavity a distance of greater than or equal to a distance that the second plate extends from the fourth wall.

In one embodiment, an integral box comprises a base comprising a perimeter; a first wall, second wall, third wall, and fourth wall extending from the base to form a cavity, a first opening in the first wall and configured to accept wiring, a second opening in the second wall and configured to accept wiring, a first plate extending from the first wall over the cavity and integrally attached to the third wall and the forth wall, and a second plate extending from the second wall over the cavity and integrally attached to the third wall and the forth wall. The integral box is formed from a single material composition.

In another embodiment, a method for making an integral box comprises casting a single, integral component. The component comprises a base comprising a perimeter; a first wall, second wall, third wall, and fourth wall extending from the perimeter of the base to form a cavity, a first opening in the first wall and configured to accept wiring, a second opening in the second wall and configured to accept wiring, a first plate extending from the first wall over the cavity and integrally attached to the third wall and the forth wall, and a second plate extending from the second wall over the cavity and integrally attached to the third wall and the forth wall.

The disclosure can be understood more readily by reference to the following detailed description of the various features of the disclosure and the examples included therein.

BRIEF DESCRIPTION OF THE DRAWINGS

Refer now to the figures, which are exemplary embodiments, and wherein the like elements are numbered alike.

DETAILED DESCRIPTION

The wiring boxes described herein offer superior performance in severe weather when evaluated by organizations that promulgate standards in connection with a minimum resistance to the environmental forces. There remains a need for a junction cavity or box that is more resistant to increased environmental forces. Embodiments discussed herein have enhanced and facile processability including a no-assembly process in addition to improved weatherability. The wiring junction cavity can be aluminum or other castable grade metal and can be formed as a single, unitary element. In other words, the plate(s) are formed contemporaneously with the walls and base and not formed separately and then attached to the formed walls.

In one embodiment, an integral box comprises a base having a perimeter with a first wall, second wall, third wall, and fourth wall extending therefrom to form a cavity, a first hole in the first wall and configured to accept wiring, a second hole in the second wall and configured to accept wiring, a first plate extending from the first wall over the cavity and integrally attached to the third wall and the forth wall, and a second plate extending from the second wall over the cavity and integrally attached to the third wall and the forth wall. The whole box is formed as a single cast component.

In another embodiment, an integral box comprises a base having a perimeter with a first wall, second wall, third wall, and fourth wall extending therefrom to form a cavity, a first hole in the first wall and configured to accept wiring, a second hole in the second wall and configured to accept wiring, a first plate extending from the first wall over the cavity and integrally attached to the third wall and the forth wall, and a second plate extending from the second wall over the cavity and integrally attached to the third wall and the forth wall. The integral box is formed from a single material composition.

In one embodiment, a method for making an integral box comprises: casting a single, integral component. The component comprises a base having a perimeter with a first wall, second wall, third wall, and fourth wall extending therefrom to form a cavity, a first hole in the first wall and configured to accept wiring, a second hole in the second wall and configured to accept wiring, a first plate extending from the first wall over the cavity and integrally attached to the third wall and the forth wall, and a second plate extending from the second wall over the cavity and integrally attached to the third wall and the forth wall. The whole box is formed as a single cast component.

Figure 1:
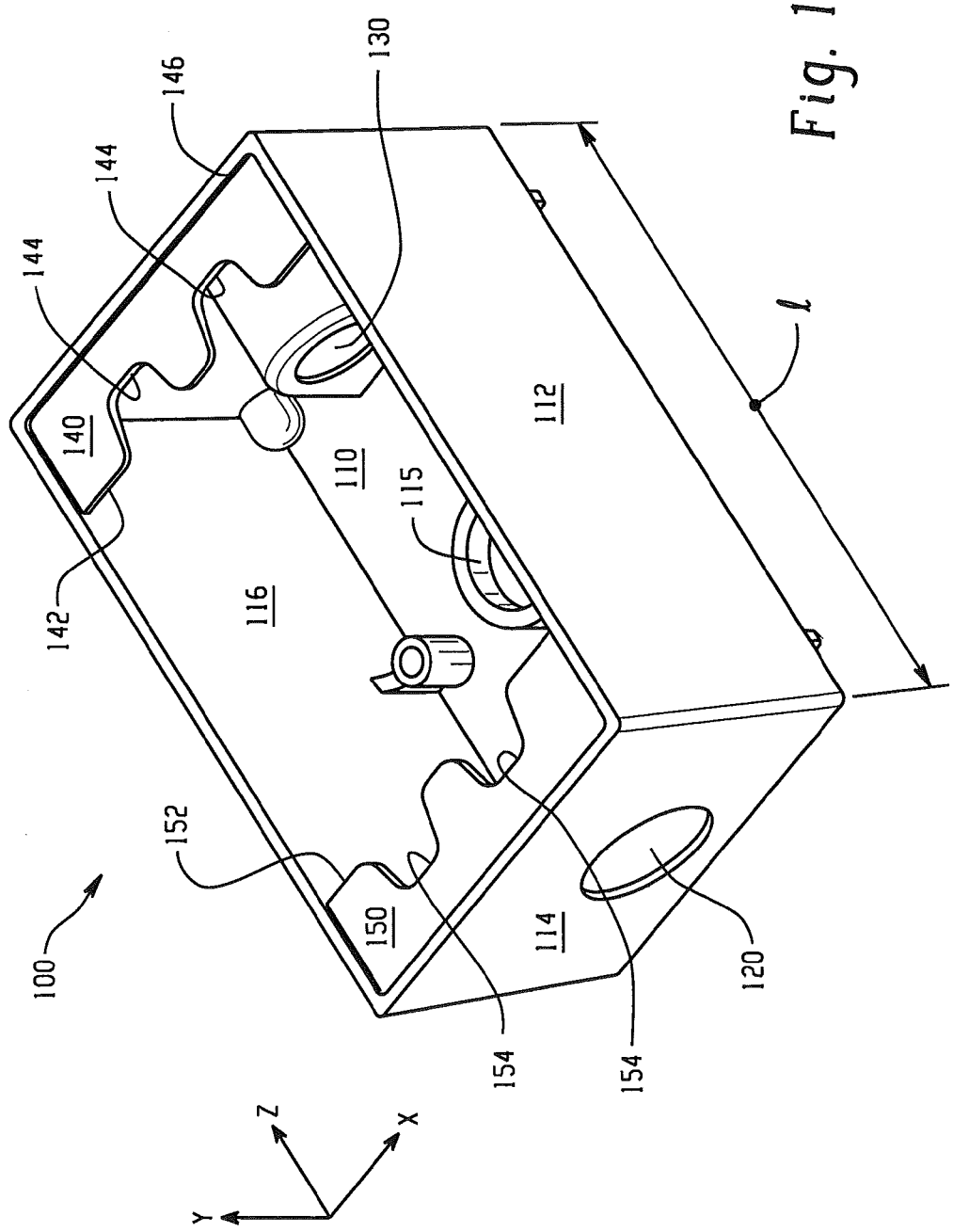
FIG. 1 is a top perspective view of an embodiment of the wiring box.
Figure 2:
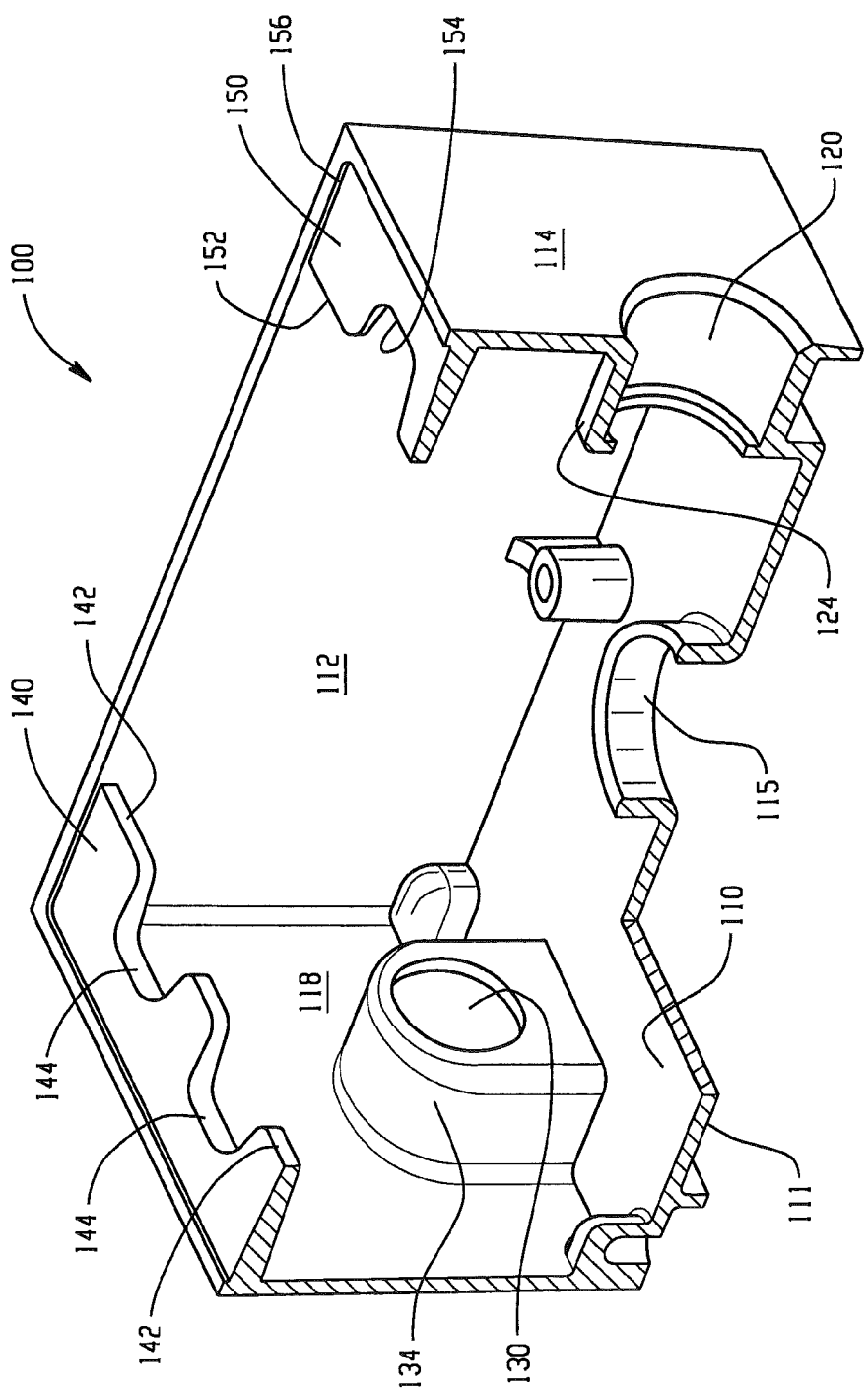
FIG. 2 is a cut away prospective view of the wiring box of FIG. 1.
Figure 3:
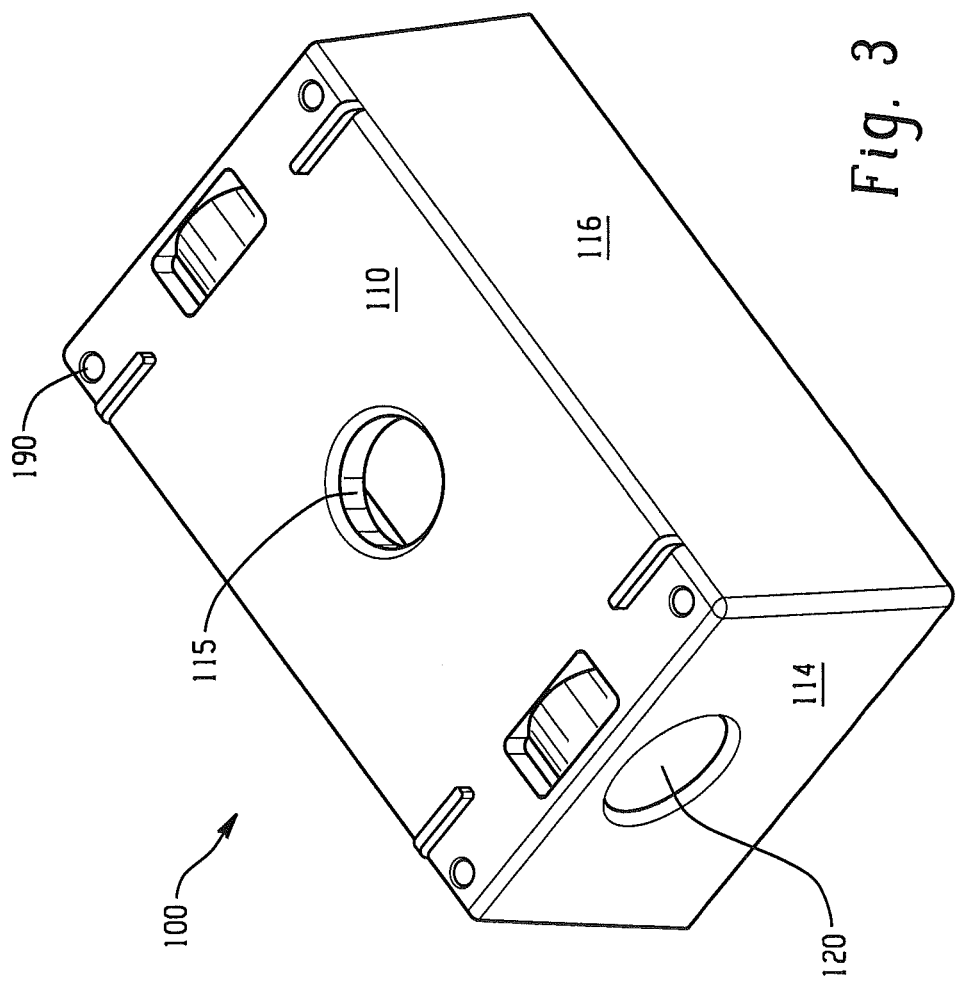
FIG. 3 is a bottom prospective view of the opposite side of the wiring box illustrated in FIG. 1.

Referring to FIGS. 1-3, the electrical box has a wiring cavity 100 that comprises a base 110 having a perimeter 111 and having hole(s) 115 configured to accept the wiring (not shown). The cavity (open box) is formed by walls 112 (first), 114 (second), 116 (third), 118 (fourth), (e.g., wall) that are attached to and extend from the perimeter of the base 110. The walls can be formed simultaneously with the base, e.g., through a process (e.g., a metal casting process) to form a unitary body.

Wiring accesses, e.g., first opening (hole) 120 in wall 114 and a second opening (hole) 130 in wall 118, enable wiring to be connected to the component (e.g., switch, electrical outlet, etc.) in the box and to an electricity source. In one embodiment, the first opening 120 is positioned to oppose the second opening 130. Openings 120 and 130 are generally substantially centered in along the length of the wall (i.e., in the x direction), and in the lower portion of the height of the wall (i.e., in the y direction), adjacent the base 110. Additionally, to enhance weatherproofing, the openings can be conduits providing access to the interior of the box. The conduits can be formed with housings that extend from the wall into the cavity 100, and can extend from the base 110 for additional structural integrity. A first extension housing 124 forms the conduit for opening 120, and a second extension housing 134 forms the second conduit for opening 130. As with plates 140, 150, the housings 124, 134 can be integrally formed with the base 110, and the walls 114, 118 (respectively). These housings 124 and 134 and openings 115, 120, 130 allow the introduction of wires into the cavity thorough base 110, wall 114, and/or wall 118.

For example, to address the desire for better weatherability (e.g., reduced wind, particulate (e.g., dirt, debris, and so forth), and/or moisture exposure to the inside of the cavity), the box can also have a first plate 140 integrally attached on three sides, e.g., to walls 112, 116, and 118 and a second plate 150 is integrally attached on three sides, e.g., to walls 112, 114, and 116. To avoid secondary operations and enhance the integrity of the wiring cavity 100, the first and second plates 140, 150 can be integrally formed with the wall 112 during a molding operation.

The plate 140 and the plate 150, which can be oriented parallel to the base 110, have opposing edges 142,152, respectively, that are free edges (e.g., they do not contact a wall, such that the plates can extend from walls 118, 114 respectively, across the cavity 100, parallel to the base 110). Each free edge 142, 152 can have indentation(s) (e.g., first cutout(s) 144 and second cutout(s) 154, respectively). The indentations or open areas, which can be helpful when forming wiring connections, accessing the cavity, and/or servicing the box, can have various geometries, e.g., semicircular, multisided, and so forth. The first edge plate 140 and/or the second edge plate 150 be disposed flush with the edges of the walls or can form a first step (or lip) 146, 156, respectively. The presence of a lip can make it easier to secure a face cover over the cavity, if desired. In other words, the plates 140, 150 can connect to the walls at a point within the cavity 100, below the wall outer edge (i.e., the edge opposite the base).

The wiring cavity 100 is illustrated as polygonal, e.g. rectangular, square, but any other geometric configuration that accommodates the desired component and wiring connections is possible.

The box can be attached to a wall, joist, ceiling, etc., with mounting hole(s) 190, to avoid unintended movement. Wires can then be introduced into the box via opening 120 and housing 124, opening 130 and housing 134, and/or opening 115. Disposed around the wires can be a gasket(s), grommet(s), other waterproof sealants (e.g., silicone) to inhibit the passage of moisture, debris, etc., into the cavity 100.

The present box, comprising a unitary element (i.e., wholly formed in a casting process without separately attachable plates or walls), has wholly overcome the issue tested for with UL514A. This test was used to test prior, multiple part boxes that had a steel strip (e.g., steel plate) crimped to the box. The test was intended to ensure that the steel strip remained adhered to the box under various conditions. Often, however, the boxes failed this test. Since the present box is a unitary design wherein the whole box is formed from a single casting, there is no crimped steel strip and hence no issues of failure of the crimp to the box. The integral box is formed as a single cast component. It is formed from a single composition (e.g., one metal or metal alloy), and therefore has a uniform composition.

The present box comprising a unitary element, requiring no post-assembly process or procedure, reduces the number of components required to form a wiring box. Further, the use of integral plates eliminates the need for support ribs because the plates are formed with the base and the walls thus eliminating the need for the plates to be attached to the box via the use of supporting ribs. Accordingly, less material is required to form the box and less labor is needed, as there is no longer a post-assembly requirement. Hence, this unitary electrical junction box reduces materials and labor costs while never failing or even needing to test UL514A.

In one embodiment, an integral box can comprise: a base; a first wall, a second wall, a third wall, and a fourth wall, extending from the base to form a cavity, and having a first wire access point; a first plate extending from the second wall and between the first wall and third wall; and optionally a second plate extending from the fourth wall and between the first wall and third wall. The base, first wall, second wall, third wall, fourth wall, first plate and second plate, are formed as a single component (e.g., cast as a single component; not assembled from multiple parts). The integral box has a uniform composition (e.g., the entire box is formed from the same metal, metal alloy, or metal composition).

In some embodiments, the second wall has a first conduit extending from the first wire access point into the cavity, the fourth wall comprises a second conduit extending into the cavity from a second wire access point, and/or the base comprises a third wire access point. Optionally, the first conduit can extend into the cavity a distance of greater than or equal to a distance that the first plate extends from the second wall, and wherein the second conduit extends into the cavity a distance of greater than or equal to a distance that the second plate extends from the fourth wall. Also optionally, the first plate and the second plate cover a portion of the opening to the cavity, opposite the base. The portion of the opening that is covered by these plates is less than or equal 50% of the opening, specifically, less than or equal to 40%. In other words, the plate distance (i.e., the distance the first plate extends across the cavity from the second wall plus the distance the second plate extends across the cavity from the fourth wall) is less or equal to 50% of the length ("l") of the first wall 112 (see FIG. 1).

"Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The terms vertical and horizontal are merely used for clarity in describing the elements illustrated in the figures, and are not intended to limit the elements in any spatial orientation or manner. The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood and hereby contemplated that the described elements can be combined in any suitable manner in the various embodiments.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An integral box, comprising:
    a base having a third wire access point;
    a first wall, a second wall, a third wall, and a fourth wall, extending from the base to form a cavity, and having a first wire access point;
    a first plate extending from the second wall and between the first wall and third wall; and
    a second plate extending from the fourth wall and between the first wall and third wall;
    wherein the base, first wall, second wall, third wall, fourth wall, first plate, and second plate, are formed as a single component;
    wherein the second wall has a first conduit extending from the first wire access point into the cavity, and wherein the fourth wall comprises a second conduit extending into the cavity from a second wire access point; and
    wherein the first conduit extends into the cavity a distance of greater than or equal to a distance that the first plate extends from the second wall, and wherein the second conduit extends into the cavity a distance of greater than or equal to a distance that the second plate extends from the fourth wall.

2. The integral box of claim 1, wherein the integral box comprises a material selected from the group consisting of aluminum, castable grade metal, and combinations comprising at least one the foregoing.

3. The integral box of claim 1, wherein the first plate and the second plate are integrally formed with the first wall.

4. The integral box of claim 1, further comprising a gasket, grommet, or waterproof sealant disposed around wires located in the first wire access point, the second wire access point, and the third wire access point.

5. The integral box of claim 1, wherein the first plate and the second plate cover a portion of an opening to the cavity, opposite the base.

6. The integral box of claim 5, wherein the portion of the opening that is covered by the first plate and the second plate is less than or equal to 50% of the opening.

7. An integral box, comprising:
    a base comprising a perimeter;
    a first wall, a second wall, a third wall, and a fourth wall extending from the perimeter of the base to form a cavity;
    a first opening in the first wall configured to accept wiring;
    a second opening in the second wall configured to accept wiring;
    a first plate extending from the first wall over the cavity, wherein the first plate is integrally attached to the third wall and the fourth wall;
    a second plate extending from the second wall over the cavity, wherein the second plate is integrally attached to the third wall and the fourth wall;
    wherein the integral box is formed from a single material composition.

8. The integral box of claim 7, wherein the integral box comprises a material selected from the group consisting of aluminum, castable grade metal, and combinations comprising at least one the foregoing.

9. The integral box of claim 7, wherein the first plate and the second plate cover a portion of an opening to the cavity, opposite the base.

10. The integral box of claim 9, wherein the distance the first plate extends across the cavity from the second wall plus the distance the second plate extends across the cavity from the second wall is less than or equal to 50% of the length of the first wall.

11. The integral box of claim 7, further comprising a gasket, grommet, or waterproof sealant disposed around wires located in the first opening in the first wall and around wires located in the second opening in the second wall.

* * * * *